(12) United States Patent
Schneider

(10) Patent No.: US 9,114,851 B2
(45) Date of Patent: Aug. 25, 2015

(54) DRIVE FOR A PEDAL VEHICLE, PARTICULARLY FOR CHILDREN

(71) Applicant: Franz Schneider GmbH & Co. KG, Neustadt (DE)

(72) Inventor: Frank Schneider, Neustadt (DE)

(73) Assignee: Franz Schneider GmbH & Co. KG, Neustadt (DE)

( * ) Notice: Subject to any disclaimer, the term of this patent is extended or adjusted under 35 U.S.C. 154(b) by 63 days.

(21) Appl. No.: 13/856,615

(22) Filed: Apr. 4, 2013

(65) Prior Publication Data

US 2013/0263696 A1   Oct. 10, 2013

(30) Foreign Application Priority Data

Apr. 7, 2012 (DE) .......................... 10 2012 007 166

(51) Int. Cl.
| | | |
|---|---|---|
| *F16H 3/72* | (2006.01) | |
| *B62M 6/60* | (2010.01) | |
| *B62K 9/00* | (2006.01) | |
| *B62K 9/02* | (2006.01) | |

(52) U.S. Cl.
CPC .. *B62M 6/60* (2013.01); *B62K 9/00* (2013.01); *B62K 9/02* (2013.01)

(58) Field of Classification Search
CPC .............. B62M 6/60; B62K 9/02; B62K 9/00
USPC ........ 74/625, 661, 665 A; 475/5, 4, 162, 169, 475/340, 210, 212, 213, 269, 297, 149, 150, 475/330, 182, 183, 184, 185, 187, 188, 190, 475/191; 180/205.1, 206.4, 206.6; 192/48.92

See application file for complete search history.

(56) References Cited

U.S. PATENT DOCUMENTS

| | | | | |
|---|---|---|---|---|
| 3,759,339 | A * | 9/1973 | Farrow ........................... | 180/216 |
| 4,183,418 | A * | 1/1980 | Dudas ............................ | 180/216 |
| 4,227,589 | A * | 10/1980 | Chika .......................... | 180/205.7 |
| 4,456,277 | A * | 6/1984 | Carpenter ..................... | 280/282 |
| 5,901,973 | A * | 5/1999 | Warren ......................... | 280/260 |
| 6,062,329 | A * | 5/2000 | Chai ........................... | 180/206.5 |
| 6,158,542 | A * | 12/2000 | Nolet ......................... | 180/206.2 |
| 7,775,538 | B1 * | 8/2010 | Hertz et al. ................... | 280/282 |
| 8,066,089 | B2 * | 11/2011 | Murad ......................... | 180/206.5 |
| 8,651,993 | B1 * | 2/2014 | Watarai ........................ | 475/205 |
| 8,777,791 | B1 * | 7/2014 | Hino et al. ........................ | 475/5 |
| 2013/0095971 | A1 * | 4/2013 | Hino et al. ......................... | 475/5 |

* cited by examiner

*Primary Examiner* — David J Hlavka

(74) *Attorney, Agent, or Firm* — Hammer & Associates, P.C.

(57) ABSTRACT

The drive for a pedal vehicle, particularly for children, comprising a drive axle having two drive wheels, further comprising a pedal crank the pinion of which is connected via a chain to a further pinion which is firmly seated on the drive axle, is characterized in that the one drive wheel is connected via a freewheeling mechanism in both directions to the drive axle, and that the other drive wheel is freely rotatably seated on the drive axle and is drivable by an electric motor.

15 Claims, 3 Drawing Sheets

DRIVE FOR A PEDAL VEHICLE, PARTICULARLY FOR CHILDREN

The invention refers to a drive for a pedal vehicle, particularly for children, comprising a drive axle having two drive wheels, further comprising a pedal crank the pinion of which is connected via a chain to a further pinion which is firmly seated on the drive axle.

The pedal vehicle preferably comprises four wheels, as is e.g. the case with the widespread toy vehicle tractors, but it may also be a tricycle. As a rule, the invention can also be applied to pedal vehicles that are not intended as toys for children, but for use by grown-ups.

The invention shall now be described in connection with a toy vehicle for children. The conventional pedal vehicles can be easily operated by children on flat terrain. However, when the pedal vehicle is to travel on a steep route upwards, this may be too strenuous for a child. This might also be the case when a loaded trailer is coupled to the pedal vehicle or when the pedal vehicle is provided with a snow plough, to name just a few examples.

It is quite generally the object of the present invention to indicate a pedal vehicle the practical value of which is increased. If this is a pedal vehicle for children, the play value of the pedal vehicle shall also be increased.

This object is achieved according to the invention by the features of patent claim 1. Advantageous developments of the invention are characterized in the sub-claims.

According to the invention the pedal vehicle has a drive the drive axle of which is drivable by means of the pedal crank in both rotational directions, wherein the one drive wheel of the drive axle is connectable via a freewheeling or free-running mechanism in both directions to the drive axle, and wherein the other drive wheel is freely rotatably seated on the drive axle and is drivable by an electric motor.

The drive according to the invention comprises two types of drives that are independent of each other, so that the following modes of operation are feasible:
1. a motor-only drive with stationary pedals;
2. a pedal-only drive, and
3. a motor drive with pedal support, e.g. on upward slopes.

In more detail it is intended that the electric motor is connected via a freewheeling mechanism in both directions to an associated motor pinion which is meshing with a further pinion which is freely rotatably seated on the drive axle and which, in turn, is drivingly connected to the other drive wheel. Owing to the freewheeling mechanism on the electric motor, the above-mentioned pedal-only drive is feasible. It is thereby also possible to drive the pedal vehicle with an empty battery solely by means of the pedal drive.

According to a further proposal of the invention the pinion which is drivable by the electric motor and which is freely rotatably seated on the drive axle may be firmly connected to a square which engages into a corresponding recess of the associated drive wheel for joint rotation. A cylindrical sleeve which extends from the pinion almost up to the drive wheel can be arranged on the square.

According to a further proposal of the invention the electric motor is operable in both rotational directions, so that it can drive the pedal vehicle forwards and rearwards. The speed of the electric motor should be adjustable, so that the pedal vehicle is drivable at a selected speed by the electric motor.

According to a further proposal of the invention the electric motor may be connected via a two-stage planetary gear to the freewheeling mechanism. The invention is however not restricted thereto; rather, a worm gear may e.g. also be provided.

Expediently, the drive axle of the pedal vehicle is the rear axle of the vehicle. The configuration may however also be chosen such that the front axle is rotatable by the pedal crank.

Moreover, it is preferred that the drive wheel which is drivable by the pedal crank is the left rear wheel. Expediently, the housing of the associated freewheeling mechanism, which is firmly connected to the drivable ring gear of the freewheeling mechanism, is screwed with the left rear wheel.

The electric motor is preferably operated via a switch with the positions forwards/off/rearwards and with buttons on the steering wheel of the pedal vehicle. When the pedal vehicle is driven by the electric motor, its torque is transmitted via the motor pinion to the pinion which is freely rotatably seated on the drive shaft, and from said pinion via the square driving and engaging element (dog), which is firmly connected thereto, to the right rear wheel. On account of the freewheeling mechanism in the left rear wheel, a motor-only drive with stationary pedals is thereby possible.

In the case of a pedal-only drive, which is made possible by the freewheeling mechanism in both directions on the electric motor, the drive force is transmitted via the chain to the pinion which is firmly connected to the drive axle, and via the associated freewheeling mechanism, which is expediently pinned with the drive axle, to the left rear wheel.

Moreover, a motor drive with pedal support is also possible, wherein both rear wheels are driven.

It is preferred that a torpedo freewheel is used as the freewheeling mechanism in both directions, which functions by means of a bushing, which is rotatable by +/− about 85°, with recess, which is braked via a spring and a fixed driving and engaging element. Depending on the rotational direction of the axle, the engagement of one of the two resilient driving and engaging elements is possible.

An embodiment of the drive according to the invention will now be described hereinafter with reference to the attached drawings, in which.

Figure 1:
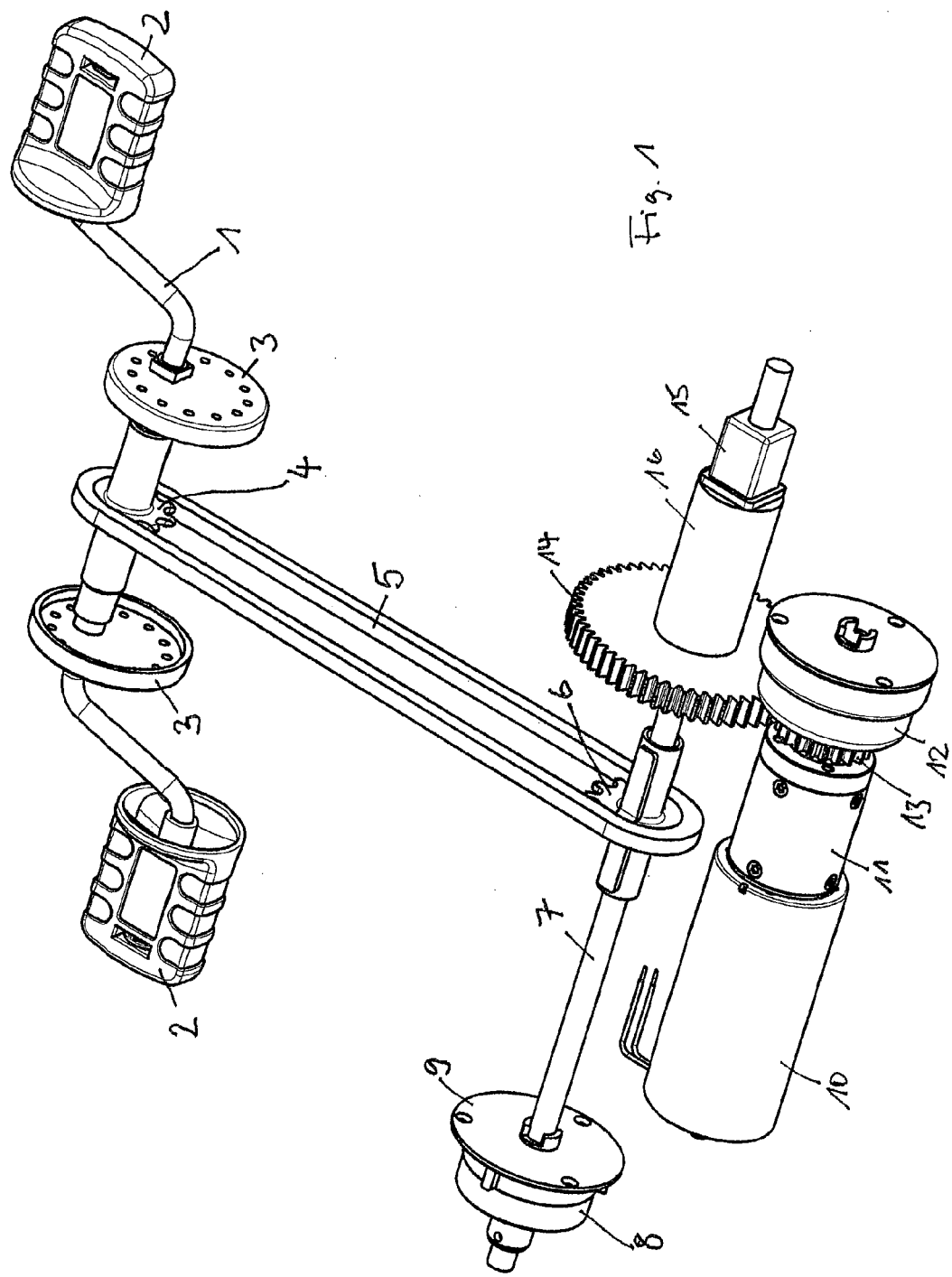
FIG. 1 is a perspective view of the drive.
Figure 2:
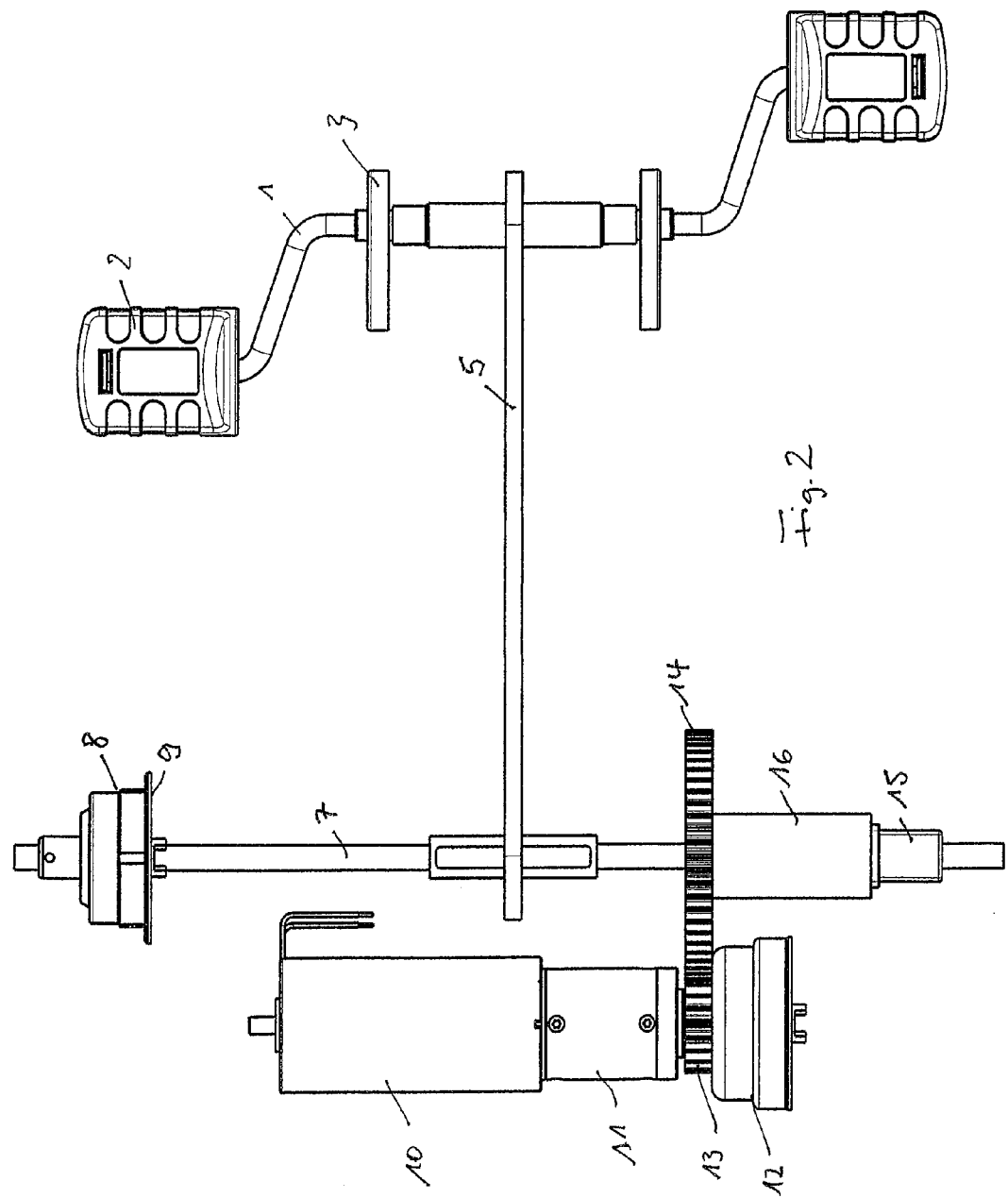
FIG. 2 is a top view on the drive according to FIG. 1.

The hybrid drive shown in FIGS. 1 and 2 includes a pedal crank 1 with two pedals 2 and eccentric bearings 3 for the pedal crank 1. A pinion 4 is firmly connected to the pedal crank 1. The pinion 4 is in driving communication via a chain 5 with a rear axle pinion 6 which is connected in a rotationally fixed manner to the rear axle 7 of a pedal vehicle (not shown).

The drive axle 7 has arranged thereon a freewheeling or free-running mechanism 8 which is operative in both rotational directions and the housing part 9 of which is screwed onto the left rear wheel of the pedal vehicle.

An electric motor 10 is connected with a planetary gear 11 and with a freewheeling (free-running) mechanism 12 in both directions for the motor shaft with a motor pinion 13 that is meshing with a further pinion 14 arranged to freely rotate on the drive axle 7. The pinion 14 is attached to a square 15 which is seated also freely rotatingly on the rear axle 7 and which engages into a corresponding recess of the right rear wheel of the pedal vehicle to drive the same. A sleeve 16 is seated on the square.

Figure 3:
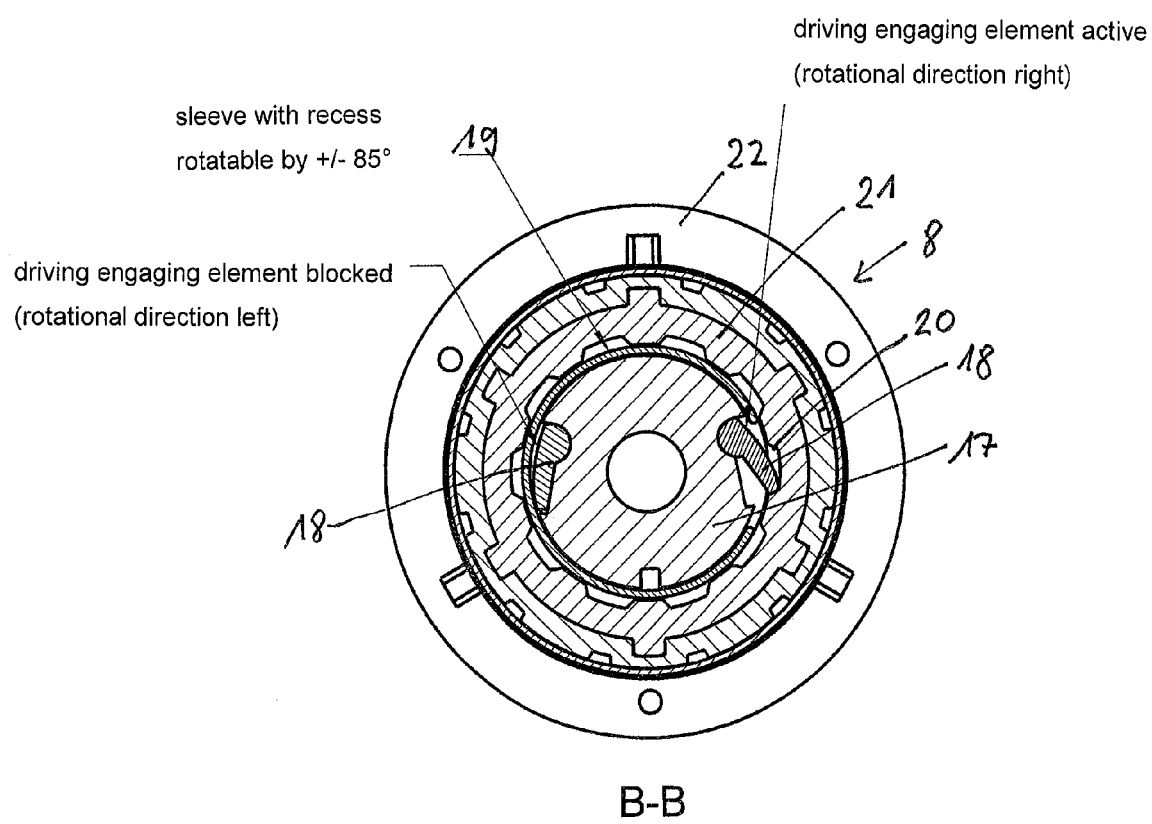
FIG. 3 is a vertical section through the freewheeling mechanism used.

The freewheeling mechanism 8 shown in FIG. 3 contains an inner wheel 17 which is firmly connected to a sleeve-like attachment which accommodates the drive axle 7 with which the attachment is pinned. The inner wheel 17 contains two spring-biased driving and engaging elements (dogs) 18 of which one, depending on the rotational direction, can engage through a recess in a rotatable sleeve 19 into a recess 20 of a radially outer ring 21 so as to engage the same upon rotation of the inner wheel 17. The outer ring 21 is firmly connected to a housing part 22 which can be screwed onto the left rear wheel of the pedal vehicle.

The invention claimed is:

1. A drive for a pedal vehicle comprising:
    a drive axle (7) with a first drive wheel and a second drive wheel, and a second pinion firmly seated thereon,
    a pedal crank (1) with a first pinion (4), and
    a chain (5) connecting the first pinion and the second pinion,
    the first drive wheel is connected to the drive axle via a first freewheeling mechanism (8) that is operable in both rotational directions, and
    the second drive wheel is freely rotatably on the drive axle (7) and is drivable by an electric motor (10),
    the electric motor (10) is connected via a second freewheeling mechanism (12) to a motor pinion (13) which meshes with a third pinion (14), the second freewheeling mechanism is operable in both rotational directions, the third pinion is freely rotatably on the drive axle (7) and is drivingly connected to the second drive wheel, and the electric motor (10) is operable in both rotational directions.

2. The drive according to claim 1, wherein the third pinion (14) is firmly connected to a square (15) on which the second drive wheel is seated in a rotationally fixed manner.

3. The drive according to claim 1 wherein a speed of the electric motor (10) is adjustable.

4. The drive according to claim 1, wherein a two-stage planetary gear (11) connects the electric motor to the second freewheeling mechanism (12).

5. The drive according to claim 1, wherein the drive axle (7) is a rear axle of the pedal vehicle.

6. The drive according to claim 1, wherein a first drive wheel is drivable by the pedal crank (1).

7. The drive according to claim 6, wherein a housing (9) of the first freewheeling mechanism (8) is screwed to the first drive wheel.

8. The drive according to claim 2, wherein a cylindrical sleeve (16) which extends from the third pinion (14) to the second drive wheel is arranged on the square (15).

9. A drive for a pedal vehicle comprising:
    a drive axle (7) with a first drive wheel and a second drive wheel, and a second pinion firmly seated thereon,
    a pedal crank (1) with a first pinion (4), and
    a chain (5) connecting the first pinion and the second pinion,
    the first drive wheel is connected to the drive axle via a first freewheeling mechanism that is operable in both rotational directions, and
    the second drive wheel is freely rotatably on the drive axle (7) and is drivable by an electric motor (10),
    the electric motor (10) is connected via a second freewheeling mechanism (12) to a motor pinion (13) which meshes with a third pinion (14), the second freewheeling mechanism is operable in both rotational directions, and the third pinion is freely rotatably on the drive axle (7) and is drivingly connected to the second drive wheel, and the electric motor (10) is operable in both rotational directions, and
    the third pinion (14) is firmly connected to a square (15) on which the second drive wheel is seated in a rotationally fixed manner.

10. The drive according to claim 9 wherein a speed of the electric motor (10) is adjustable.

11. The drive according to claim 9, wherein a two-stage planetary gear (11) connects the electric motor to the second freewheeling mechanism (12).

12. The drive according to claim 9, wherein the drive axle (7) is a rear axle of the pedal vehicle.

13. The drive according to claim 9, wherein the first drive wheel is drivable by the pedal crank (1).

14. The drive according to claim 13, wherein a housing (9) of the first freewheeling mechanism (8) is screwed to the first drive wheel.

15. The drive according to claim 9, wherein a cylindrical sleeve (16) which extends from the third pinion (14) to the second drive wheel is arranged on the square (15).

* * * * *